United States Patent [19]
Smith et al.

[11] Patent Number: 5,510,078
[45] Date of Patent: Apr. 23, 1996

[54] METHOD OF LINING PIPELINES AND PASSAGEWAYS

[75] Inventors: Edward P. Smith; Graham F. Towers, both of Northants, United Kingdom

[73] Assignee: Insituform (Netherlands) B.V., Netherlands

[21] Appl. No.: 199,260

[22] PCT Filed: Aug. 14, 1992

[86] PCT No.: PCT/GB92/01508

§ 371 Date: Jul. 1, 1994

§ 102(e) Date: Jul. 1, 1994

[87] PCT Pub. No.: WO93/05333

PCT Pub. Date: Mar. 18, 1993

[30] Foreign Application Priority Data

Sep. 6, 1991 [GB] United Kingdom ............... 9119100

[51] Int. Cl.[6] .................................................. B29C 63/36
[52] U.S. Cl. ............... 264/516; 264/36; 264/269; 156/287; 156/294
[58] Field of Search ............... 138/97, 98; 264/36, 264/269, 516; 156/287, 294

[56] References Cited

U.S. PATENT DOCUMENTS

| | | | |
|---|---|---|---|
| 4,602,974 | 7/1986 | Wood et al. | 156/294 |
| 4,714,095 | 12/1987 | Muller et al. | 156/287 |
| 4,770,562 | 9/1988 | Muller et al. | 156/287 |
| 5,384,086 | 1/1995 | Smith | 264/269 |

FOREIGN PATENT DOCUMENTS

| | | |
|---|---|---|
| 82212 | 6/1983 | European Pat. Off. . |
| 275060 | 7/1988 | European Pat. Off. . |
| 1580438 | 12/1980 | United Kingdom . |
| WO 90/12241 | 10/1990 | WIPO . |

*Primary Examiner*—Mathieu D. Vargot
*Attorney, Agent, or Firm*—Cowan, Liebowitz & Latman

[57] ABSTRACT

A lining process for a pipeline or passageway employs a resin impregnated lining tube which is everted into a collapsed preliner tube in the passageway to be lined. A constraining element allows the preliner tube to expand only in the vicinity of the everting face so that a pool of resin is formed between the everting face and the preliner tuber adjacent to the constraining element. In this manner, air is prevented from communicating with the everting face.

8 Claims, 4 Drawing Sheets

METHOD OF LINING PIPELINES AND PASSAGEWAYS

BACKGROUND OF THE INVENTION

This invention relates generally to the lining of pipelines and passageways using tubular liners which are of a nature such that when they are inserted into the pipeline or passageway they are flexible in nature and can therefore be inflated to conform with the pipeline or passageway surface, but which are in fact of a type containing curable synthetic resin which is caused to cure to a hard condition when the liner is held to the passageway surface so that eventually when the resin cures, the lining will form a hard passageway lining pipe.

The lining tube may typically comprise a layer or layers of resin absorbent material such as fibrous felt or layers of glass fibre matting which soaks up the resin when applied, to give the lining tube a certain amount of bulk and thickness so that in effect a hard lining pipe will eventually be formed. The said layer or layers is or are usually surrounded initially by an impermeable film or coating, which is usually a coating bonded to the layer of fibrous material or the outer layer of fibrous material.

The general process outlined above has been practiced by the assignee herein for many years and on a highly successful basis. The lining tubes are marketed under the trademark "Insitutubes" (registered trade mark) and the cured lining pipes are marketed under the trademark "Insitupipes" (registered trade mark)

We have previously proposed that the lining tube may be inserted by connecting to one end of same what is referred to as a preliner which is a tube made from flexible material such as woven fabric or a plastic film, and which is applied to the pipeline or passageway surface to line same before the lining tube is inserted, hence the name preliner. Also, to the other end of the lining tube is attached an inflation tube which may be of a like material to the preliner, but which is used to inflate the lining tube, when it is in position, by being everted, by using fluid pressure, into the inside of the lining tube. The fluid used may be gaseous or liquid, but in either event the inflation tube inflates the lining tube up into conforming configuration with the pipeline or passageway surface where it is held until the resin is cured either naturally, or by forced curing involving the application of heat or light (when the resin is a light cure resin).

This method of installing the lining tube has become known by the description "triple inversion". The method involves everting the preliner into the pipeline or passageway using fluid pressure, which has the effect of pulling the lining tube into the pipeline or passageway until it reaches at the desired position, and then the inflation tube is everted into the inside of the lining tube to inflate same.

The method which was used previously for inserting the lining tube was simply to evert same into the pipeline or passageway using fluid pressure.

The "Triple Inversion" method has been developed to enable the cured lining pipes to be made with no entrapment of air in the resin/felt during inversion and this is very successful but is expensive in that a coating is needed on the outside as well as on the inside and the installation takes longer than a single inversion method. An alternative method of achieving the same object is to trap a slug of resin against the everting face with a rolling pig. For pipelines with lateral connections, manholes, etc. it is necessary to use a strong preliner to contain the pig and resin. This method has been demonstrated successfully. The invention disclosed herein achieves the same effect without the need for a rolling pig filling the pipeline.

SUMMARY OF THE INVENTION

In preferred forms of the present invention a preliner, a tube made from a flexible material such as a woven fabric or a plastic film, which is substantially impermeable to air, water and resin is pulled through a pipe to be lined by any well known means. Conveniently, it may be everted by low pressure air and then allowed to collapse or may be pulled through by a rope. The preliner tube is in a layflat, closed, condition and is constrained by any of the means disclosed below so that it will not inflate until an internal pressure is applied, which pressure, expressed as a head of water, is greater than the pipe diameter but is considerably less than the pressure of water at which the lining tube is everted.

BRIEF DESCRIPTION OF THE DRAWING

Comprehension of the invention is facilitated by reading the following detailed description in conjunction with the annexed drawings, in which.

DETAILED DESCRIPTION

Figure 1:
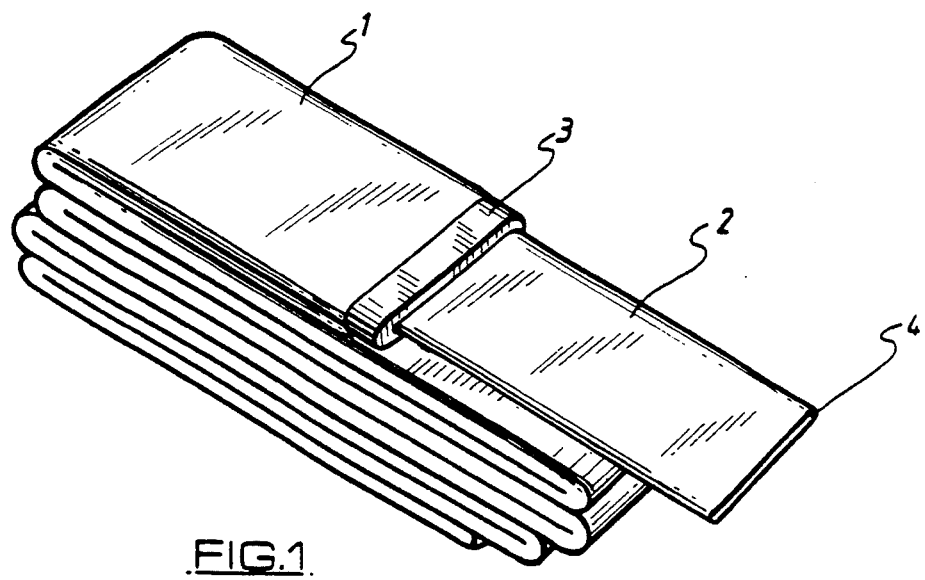
FIG. 1 is an isometric representation of a specific illustrative embodiment of the invention, showing the lining tube, a lay-flat tube, and a seal between the lining tube and the lay-flat tube.

A lining tube is made in the normal way but provision is made to seal the normally open end after wet-out as shown in FIG. 1 in which (1) is the lining tube made from a number of layers of felt and having an outer coating of a suitable impermeable plastic or elastomeric material. (2) is a thin lay-flat tube of an impermeable plastic or coated fabric which is sealed to the lining tube round its periphery at (3) to prevent air ingress or resin egress and (4) is the seal at the end of the lay-flat tube. This seal may be made by heat fusion or an adhesive but is comparatively weak so that it will open when the lining tube is inverted through it. The length of the lay-flat tube (2) is sufficient to pass from the inversion ring well in to the preliner. The felt tube is impregnated with resin in the normal way under a vacuum to expell all air, and the ends are sealed to prevent resin escape and to prevent air penetrating into the felt/composite.

Figure 2:
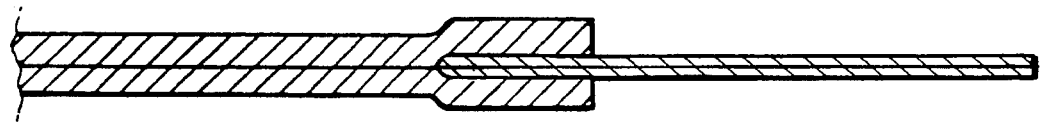
FIG. 2 is a partially cross-sectional representation of the interrelationship between the lining tube and the lay-flat tube.
Figure 3:
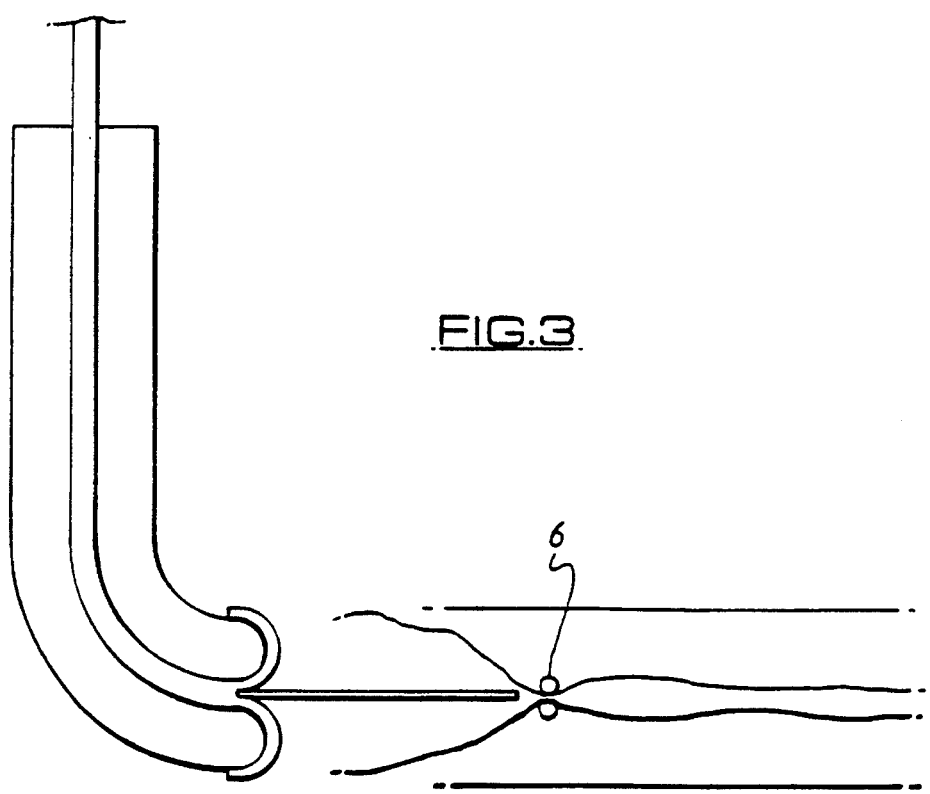
FIG. 3 is a schematic plan representation of an embodiment of the invention wherein the end of the liner tube is turned back over a bottom inversion ring.
Figure 4:
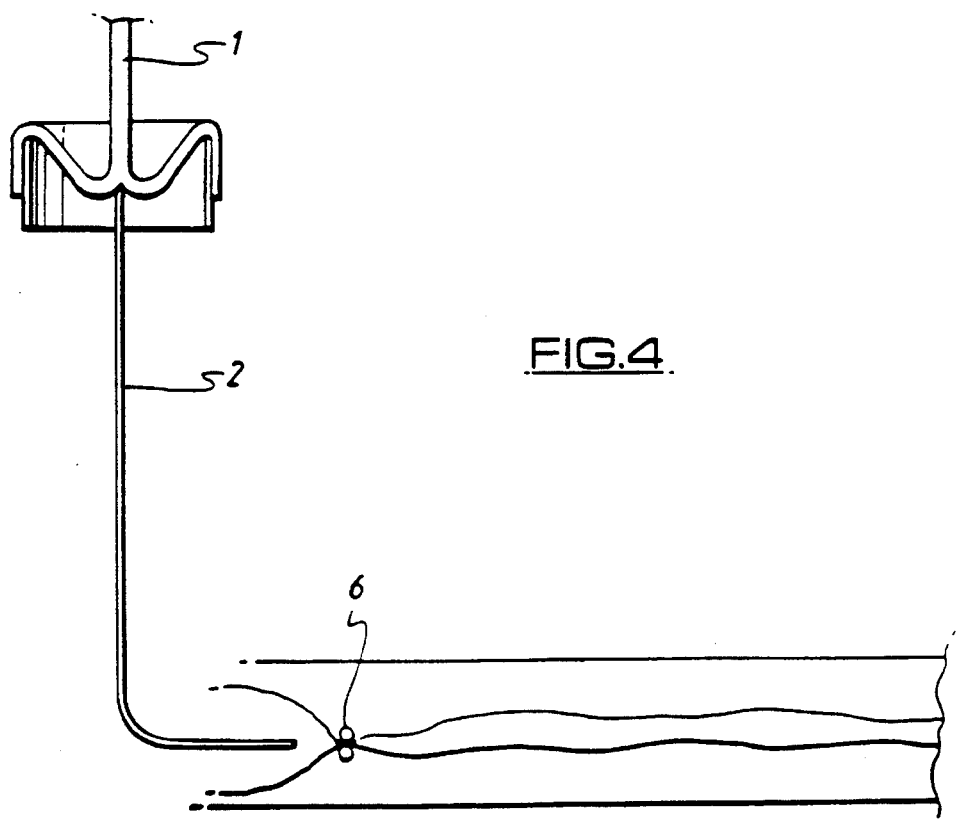
FIG. 4 is a schematic plan representation of an embodiment of the invention wherein the end of the liner tube is turned back over a top inversion ring.

The lay-flat tube (2) is tucked into the felt tube as shown in the sectional view FIG. 2 so that the end can be turned back over a bottom inversion ring as shown in sectional view FIG. 3 or placed over a top inversion ring as shown in FIG. 4.

In one embodiment of the invention a rolling ring (6) is placed round the preliner in the position shown in FIG. 4. This ring is so designed that it constricts the preliner in a number of folds as the ring rolls along and the force of the constriction is such as to prevent resin within the preliner at one side of the ring from passing to the other side of any appreciable quantity.

Figure 5:
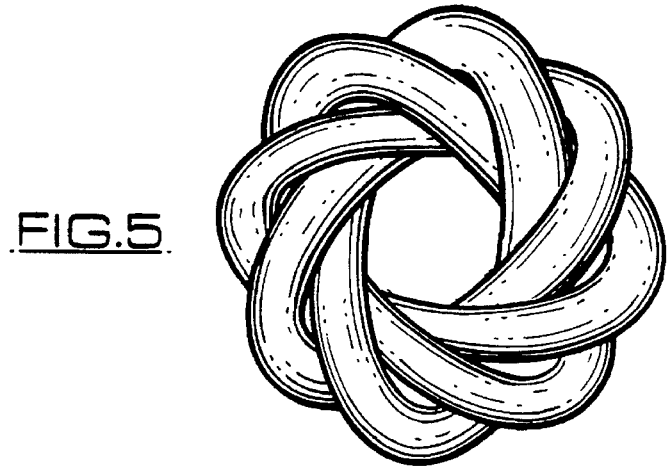
FIG. 5 is a plan representation of a plurality of intertwind "O"-shaped rings.

The rolling ring may be a thick rubber '0' ring or preferably made from a number of rubber '0' rings twisted together during manufacture as depicted in FIG. 5 so that should any one of the 0-rings fail in service the remainder will still serve to constrict the preliner.

Figure 6:
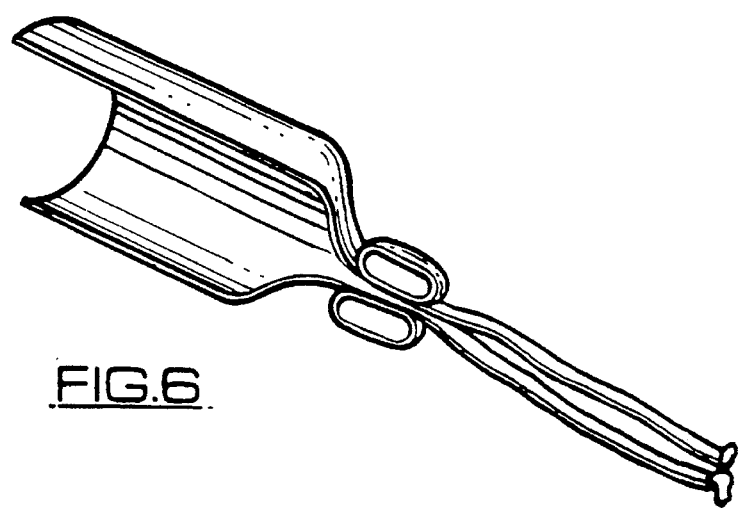
FIG. 6 is an isometric representation of an embodiment of the invention showing a rolling pig.

Alternatively the rolling ring may be a "rolling pig" which is a reinforced rubber tube turnbed back on itself and its ends bonded to each other so that air introduced through an integral non-return valve will not leak out and will inflate the "pig" to constrict the preliner as shown in the sectional view of FIG. 6.

Figure 7:
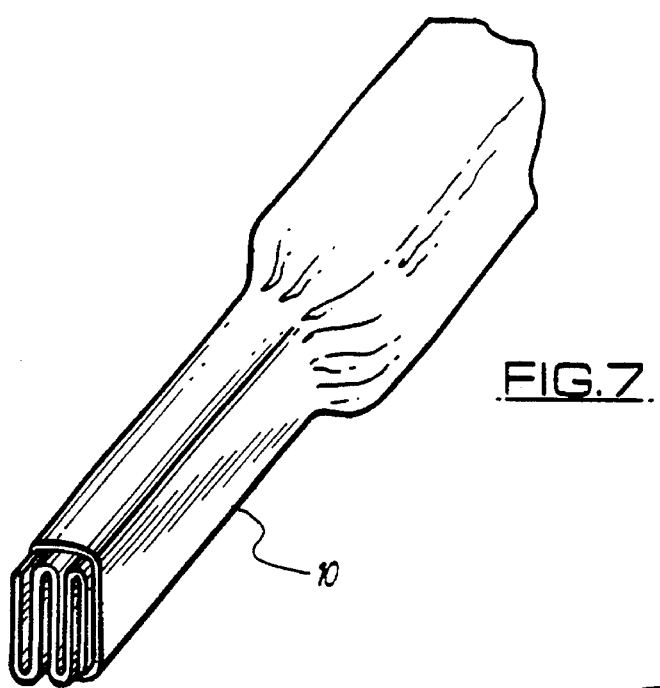
FIG. 7 is an isometric representation of an embodiment of the invention showing the preliner folded and held in that position by a tube of relatively weak material.

In another embodiment the preliner is folded and held in that position along its full length by a tube of a comparatively weak material, as shown in FIG. 7, so that the outer weak tube (10) will tear or otherwise fail when a pressure is applied by the inverting lining tube thereby allowing the preliner to open.

Figure 8:
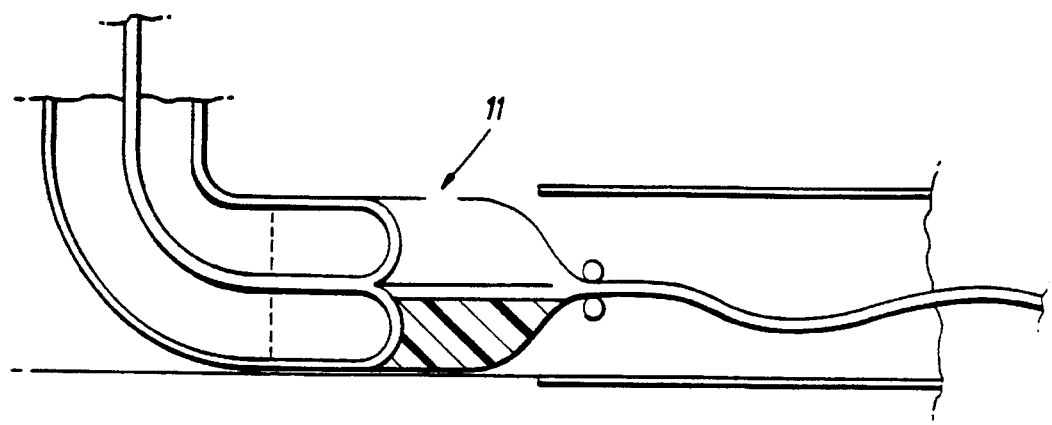
FIG. 8 is a schematic plan representation of an embodiment of the invention showing water being introduced to invert the liner tube through the lay-flat tube.

The lining tube is bonded on to a top ring (FIG. 4) or bottom inversion ring (FIG. 3) and water is introduced to invert the tube through the sealing lay-flat tube until it is in the open end of the preliner as shown in FIG. 8. A quantity of extra resin is then introduced through a hole (11) in the top of the preliner as depicted in FIG. 8.

Figure 9:
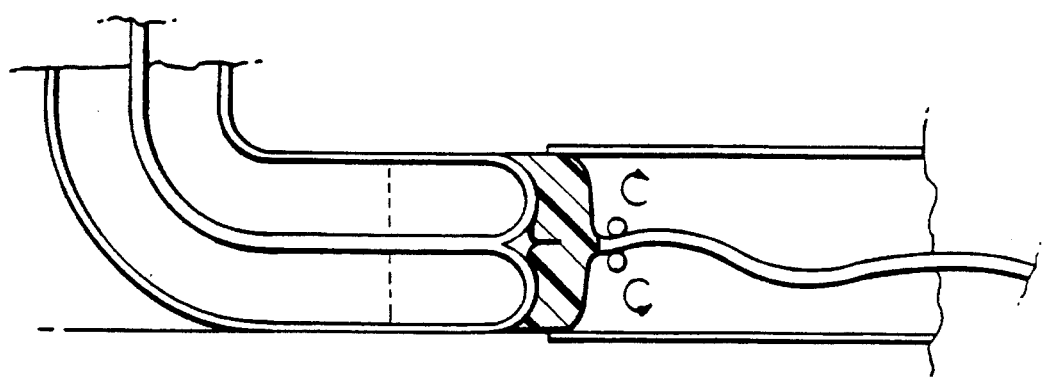
FIG. 9 is a schematic plan view of an embodiment of the invention showing the application of pressure to a pool of resin.

The lining tube is then slowly inverted towards the constricted preliner so that the air above the extra resin is expelled through the hole at the top of the preliner. When all the air is expelled the hole is sealed by any convenient means so that further inversion of the lining tube applies pressure to the extra resin (FIG. 9). This pressure causes the preliner to open either by the rolling ring moving along the preliner or, in the other embodiment, by the progressive failure of the outer constricting tube. At this stage the lining tube inverts through the sealed end (3) and continues down through the preliner. In this way the lining tube is always inverting into a reservoir of resin so that no air can be drawn in to the felt.

It can be seen therefore that the general concept of the present invention includes the method that the prelining tube is constrained in a flattened condition and therefore essentially excludes air, until the lining tube is everted into it to remove or displace the constraint and allow the preliner to expand with the lining tube thereby excluding air. The additional advantageous feature is that a slug of resin is entrapped between the everting face and the expanding preliner tube.

It has been noted that any suitable constraining means can be used for the preliner tube, and it should also be noted that the preliner tube although shown as otherwise disconnected from the lining tube can be connected thereto and expanded as described.

We claim:

1. A method of lining an existing passageway or conduit with a flexible resin impregnated liner, comprising:

installing a preliner tube of a flexible material in the conduit to be lined;

maintaining the preliner tube in a collapsed condition in the conduit;

installing a constraining means disposed about the exterior of the preliner tube to maintain the preliner tube in the collapsed condition;

everting a flexible lining tube including a layer of resin absorbent material impregnated with a curable synthetic resin and an outer impermeable film into the preliner tube;

placing a quantity of resin in the preliner tube in the region between the everting face of the lining tube and constraining means;

continuing to evert the lining tube into the preliner tube whereby the quantity of resin within the preliner tube at the face of the everting lining tube maintains the face of the everting lining tube fully wetted with resin and displaces the constraining means along the preliner tube as the lining tube is everted; and curing the everted lining tube in the conduit.

2. The method of claim 1, wherein the constraining means is a flexible ring which rolls along the exterior of the preliner tube as the lining tube is everted inside the preliner tube.

3. The method of claim 1, wherein the constraining means is a flexible ring formed of a plurality of flexible "O"-shaped rings twisted together.

4. The method of claim 2, wherein the flexible ring is formed of rubber.

5. The method of claim 1, wherein the constraining means is an inflated rolling pig which rolls along the outside of the preliner tube as the lining tube is everted inside the preliner tube.

6. The method of claim 1, wherein the constraining means is an elongated sleeve disposed about the preliner tube holding the preliner tube in a collapsed condition which tears as the lining tube is everted inside the preliner tube.

7. The method of claim 1, wherein the lining tube includes a flexible leader tube sealed to the leading end of the lining tube with the leader tube sealed at its leading end, and the method further includes the steps of feeding the leader tube into the preliner;

inserting the quantity of resin into the preliner tube in the region in front of the everting face of the lining tube; and expanding the leader tube and the preliner tube as the lining tube is everted.

8. The method of claim 1, further including the step of providing a vent aperture in the preliner tube to allow air to escape from the region of the quantity of resin as the everting face of the lining tube approaches the constraining means as the lining tube is everted.

* * * * *